R. C. HARRIS.
SAFETY LINK.
APPLICATION FILED AUG. 14, 1912.
1,051,224.
Patented Jan. 21, 1913.
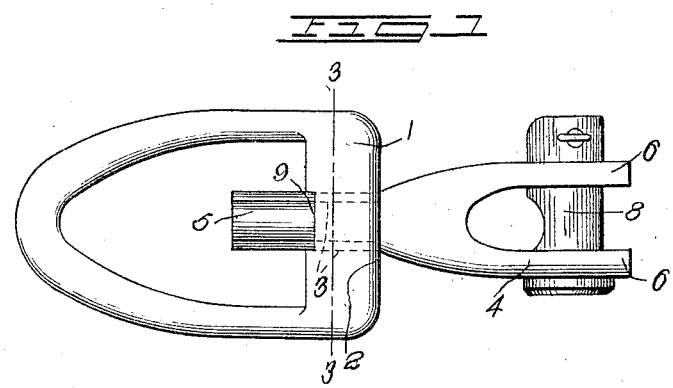
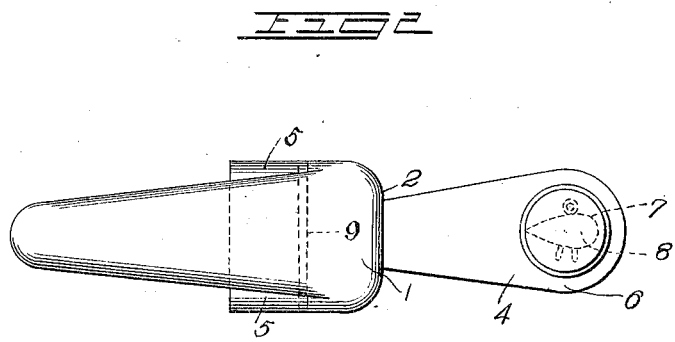
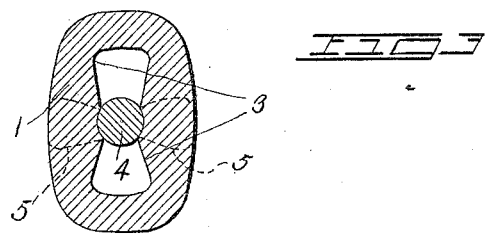
Inventor
R. C. HARRIS
Witnesses

UNITED STATES PATENT OFFICE.

REES C. HARRIS, OF BLAKELY, GEORGIA.

SAFETY-LINK.

1,051,224. Specification of Letters Patent. Patented Jan. 21, 1913.

Application filed August 14, 1912. Serial No. 715,079.

*To all whom it may concern:*

Be it known that I, REES C. HARRIS, a citizen of the United States, residing at Blakely, in the county of Early and State of Georgia, have invented new and useful Improvements in Safety-Links, of which the following is a specification.

This invention relates to safety links and the principal object of the invention is to provide a simple and efficient link for connecting a plow clevis with the swingle or double tree cuff, whereby when the horse becomes frightened and runs away, the plow will be disconnected from the swingle or double trees when the same falls.

Further objects of this invention will appear as the following specific description is read in connection with the accompanying drawing, which forms a part of this application, and in which:—

Figure 1 is a top plan view. Fig. 2 is a side elevation with parts broken away. Fig. 3 is a section on the line 3—3 of Fig. 1.

Referring more particularly to the drawing, 1 represents an ordinary shackle link having a flat end 2 provided with a key hole opening 3 formed therein. This link 1 is connected to the ordinary plow clevis and to connect the same to the swingle tree or the double tree cuff, a link 4 is provided having a key head 5 formed at one end adapted to enter the link 1 through the opening 3. The opposite end of the link 4 is bifurcated, the separate legs 6 having apertures 7 therein to receive the pin 8. The link 4 and the link 1 lie normally in the position shown in Fig. 1, and when the horses become frightened and run away and the plow drops so that the handles will touch the ground, the link 1 will be turned to a position at right angles to the position shown in Fig. 1 so as to bring the opening 3 in alinement with the head, whereby the plow and team may be automatically released. The cuff of the swingle or double tree has its yoke portion seated in the bifurcation of the link 4 and held in place therein by the pin 8.

The end 2 of the shackle link 1 is provided with a recess 9, as shown in Figs. 1 and 2 to receive the head 5 of the link 4. This recess receives the head and prevents the link 4 from turning accidentally but is not of sufficient depth to hold the link against turning when the plow falls to one side. In other words, the slight slack of the parts due to the plow falling to one side will be sufficient to disengage the head 5 from the recess and permit it to turn so as to aline with the key hole opening 3.

What is claimed is:—

1. A swingle tree connection for plows comprising a shackle link having a flat end provided with a key hole opening therein, a bifurcated link having a key head adapted to removably engage the shackle link and to normally lie across the key hole opening, and a pin bridged across the bifurcated end of said second link.

2. A swingle tree connection for plows comprising a shackle link having a flat head provided with a key hole opening therein, and recesses on opposite sides of the key hole opening, a bifurcated link having a key head adapted to removably engage the recesses and normally lie across the key hole opening, and a pin bridged across the bifurcated end of said second link.

In testimony whereof I affix my signature in presence of two witnesses.

REES C. HARRIS.

Witnesses:
J. B. TARON,
E. A. WILSON.

Copies of this patent may be obtained for five cents each, by addressing the "Commissioner of Patents, Washington, D. C."